(12) United States Patent
Jin et al.

(10) Patent No.: US 10,736,407 B1
(45) Date of Patent: Aug. 11, 2020

(54) PHONE CLIP HOLDER

(71) Applicants: Huang Jin, Ningbo (CN); Sosha Morris, Bella Vista, AR (US)

(72) Inventors: Huang Jin, Ningbo (CN); Sosha Morris, Bella Vista, AR (US)

( * ) Notice: Subject to any disclaimer, the term of this patent is extended or adjusted under 35 U.S.C. 154(b) by 0 days.

(21) Appl. No.: 16/258,107

(22) Filed: Jan. 25, 2019

(51) Int. Cl.
*H04M 1/04* (2006.01)
*A45F 5/02* (2006.01)

(52) U.S. Cl.
CPC ............... *A45F 5/02* (2013.01); *H04M 1/04* (2013.01); *A45F 2200/0516* (2013.01)

(58) Field of Classification Search
CPC .. H04M 1/04; A45F 2200/0516; G06F 1/1607
See application file for complete search history.

(56) References Cited

U.S. PATENT DOCUMENTS

| | | | | |
|---|---|---|---|---|
| 5,033,528 A * | 7/1991 | Volcani | ............. | A45B 17/00 160/351 |
| 5,619,395 A * | 4/1997 | McBride | ............. | G06F 1/1632 361/679.58 |
| 6,222,501 B1 * | 4/2001 | Yajima | ............. | H01Q 1/12 343/713 |
| 6,357,710 B1 * | 3/2002 | Fielden | ............. | A45B 11/00 248/231.51 |
| 8,128,046 B1 * | 3/2012 | Howard, Jr. | ............. | A45F 5/02 248/313 |
| 8,602,662 B1 * | 12/2013 | Mans | ............. | F16M 11/041 396/428 |
| 9,255,662 B2 * | 2/2016 | Longo | ............. | F16M 13/022 |
| 9,611,881 B2 * | 4/2017 | Khodapanah | ............. | F16B 21/06 |
| 9,695,849 B2 * | 7/2017 | Zhou | ............. | F16B 2/12 |
| 9,898,042 B2 * | 2/2018 | Abbott | ............. | G06F 1/1632 |
| 10,066,784 B2 * | 9/2018 | Wessels | ............. | F16M 13/022 |
| 10,113,688 B2 * | 10/2018 | Zhu | ............. | F16M 13/02 |
| 10,161,429 B2 * | 12/2018 | Goffman | ............. | F16M 13/022 |
| 10,342,323 B2 * | 7/2019 | Forutanpour | ............. | A45F 5/10 |
| 10,512,322 B2 * | 12/2019 | Washington | ............. | F16M 11/40 |
| 2003/0000976 A1 * | 1/2003 | Malhotra | ............. | A45F 5/00 224/197 |
| 2003/0047575 A1 * | 3/2003 | Enkerlin | ............. | A45F 5/02 224/271 |
| 2008/0110946 A1 * | 5/2008 | Dixon | ............. | A45F 5/02 224/197 |
| 2013/0228662 A1 * | 9/2013 | Green | ............. | G06F 1/1607 248/229.1 |
| 2014/0162733 A1 * | 6/2014 | Cole | ............. | B60R 11/02 455/575.1 |
| 2015/0301559 A1 * | 10/2015 | Wu | ............. | F16M 11/041 248/229.16 |
| 2017/0194994 A1 * | 7/2017 | Blackmon-Humphrey ............. H04B 1/385 |
| 2018/0003338 A1 * | 1/2018 | Scott | ............. | A45F 5/00 |
| 2018/0010622 A1 * | 1/2018 | Wu | ............. | F16B 2/10 |
| 2018/0086281 A1 * | 3/2018 | Chiou | ............. | F16M 11/14 |
| 2019/0301671 A1 * | 10/2019 | McGuyer | ............. | A01K 15/02 |

(Continued)

*Primary Examiner* — Bradley Duckworth

(57) ABSTRACT

A clip-on hands-free phone holder which attaches a phone to a laptop screen or monitor using at one end a spring-loaded clip and at the other end a magnet on a ball-and-socket joint. The phone can thereby be positioned and maintained near a laptop screen or computer monitor in a hands-free manner and easily moved or re-oriented. The phone is protected from scratches by a spacer positioned between the phone and magnet.

6 Claims, 3 Drawing Sheets

(56) References Cited

U.S. PATENT DOCUMENTS

2019/0372614 A1* 12/2019 Kovacs ................ H04B 1/3877
2020/0015577 A1* 1/2020 Biddings, Jr. ........... F16C 11/04

* cited by examiner

PHONE CLIP HOLDER

CROSS REFERENCE TO RELATED APPLICATION

Not Applicable

TECHNICAL FIELD

The present invention relates to computer and phone accessories, including but not limited to hands-free phone holding devices.

BACKGROUND OF THE INVENTION

Multi-tasking workers often use the camera on their cell phones to hold video conference calls while they are working on their computers. What is desired is an apparatus that allows for the hands-free positioning of a phone in proximity to a laptop, computer monitor, tablet, or similar device.

SUMMARY OF THE INVENTION

The present invention is a hands-free phone holder which attaches at one point via a spring-loaded clip to the side of a laptop screen, computer monitor, tablet, or other similar device and at a second point via a fastening mechanism to a phone, the two attachment points being joined by a rigid member such that said phone is oriented in the same direction as the screen or monitor to which it is attached. The second attachment point may allow for limited reorientation of the attached phone via a ball-and-socket joint.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying Figures, in which.

DETAILED DESCRIPTION OF A PREFERRED EMBODIMENT

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

Figure 1:
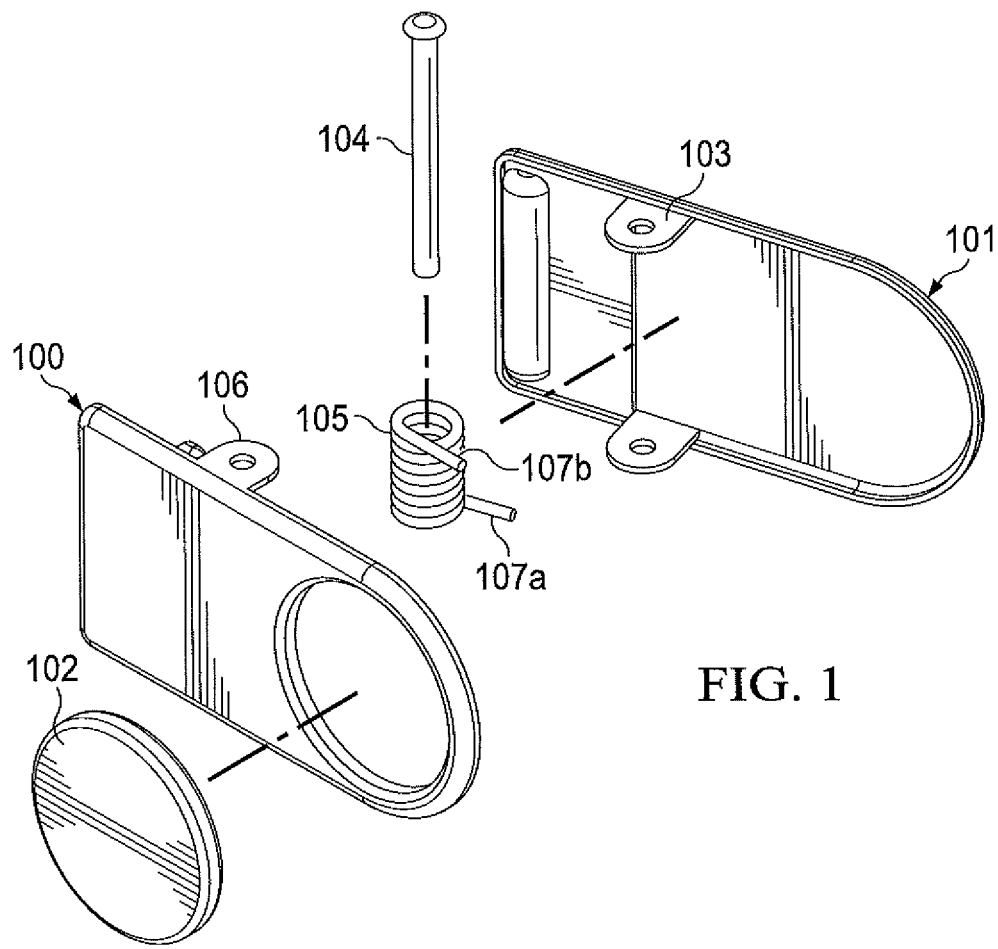
FIG. 1 is an exploded perspective view of a first embodiment of the present invention.
Figure 2:
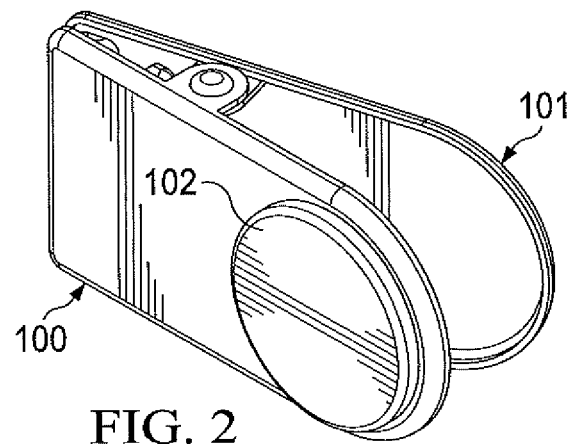
FIG. 2 is a perspective view of a first embodiment of the present invention.

Referring to FIG. 1, the present invention is a hands-free clip-on phone holder comprising a body 100 having at one end a first attachment mechanism and at a second end a second attachment mechanism, said first attachment mechanism comprising a clip member 101, a pin 104, and a spring 105, said clip member 101 having two supports 103 at the sides of said clip member extending in a direction normal to the plane of said clip member and being located between one-fourth and one-third the length of said clip member from one end, said supports having holes adapted to receive said pin 104, said body 100 having at its first attachment end complementary supports 106 to the supports 103 of said clip member, said clip member being joined to said body by aligning the holes of the supports of said clip member and said body and inserting said pin, thereby forming a pivot point such that said clip member may rotate about said point; said clip member being biased to a closed position by a spring 105 having at one end an extension 107a held against said clip member and at the other an extension 107b held against said body, the biasing force being provided by the normal forces of the spring extensions against the respective surfaces as the spring is wound; said first attachment mechanism being thus a lever operable by applying pressure to one end of the clip member via a thumb or finger.

In one embodiment, said second attachment mechanism comprises a magnet 102 located on said body 100 on the side opposite said clip member.

Figure 3:
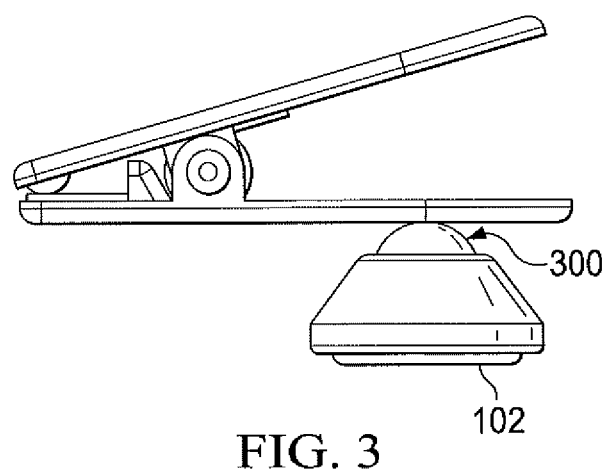
FIG. 3 is a top view of a second embodiment of the present invention.

In a second embodiment, referring to FIG. 3, said second attachment mechanism comprises a magnet 102 joined to said body by a ball-and-socket joint 300 allowing for rotation within a limited range of said second attachment mechanism and attached phone relative to said body about any axis.

Figure 4:
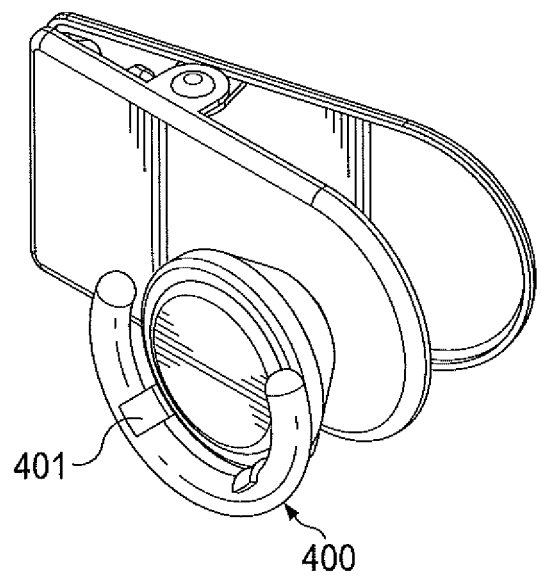
FIG. 4 is a perspective view of a third embodiment of the present invention.

In a third embodiment, referring to FIG. 4, said second attachment mechanism comprises a magnet joined to said body by a ball-and-socket joint and a spacer 400 extended a small distance in front of said magnet by supports 401 such that said phone is held in place without contacting said magnet, said spacer being made of a soft or rubber-like material in order to prevent damaging the back of said phone.

Figure 5:
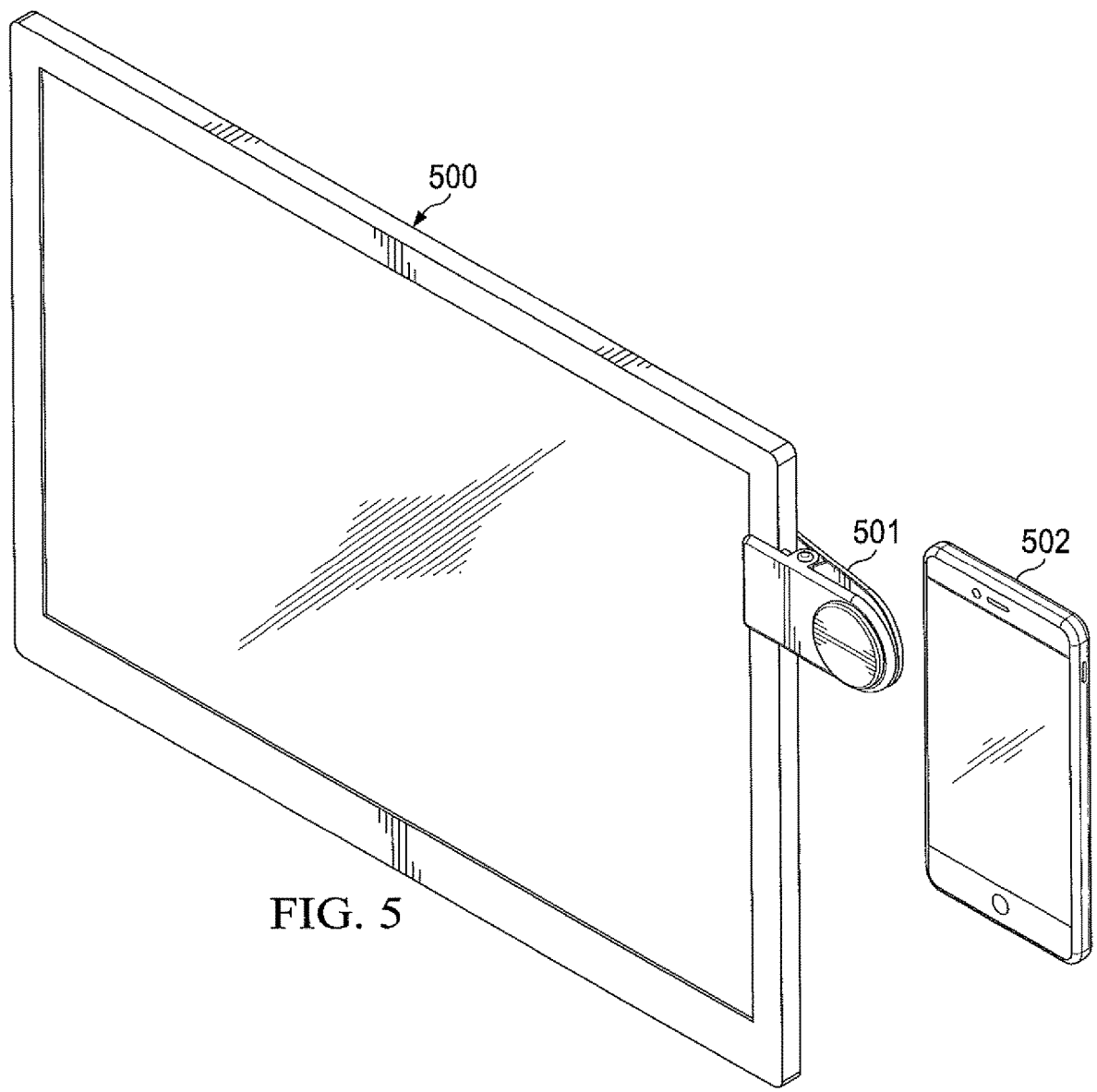
FIG. 5 is a perspective view showing one embodiment of the present invention in use.

Referring to FIG. 5, the invention is operated by first squeezing said clip member and said body at a point behind said pivot point so as to open said first attachment mechanism, placing a laptop screen, computer monitor edge, or object of similar thinness 500 between said member and said body, releasing said clip member, thereby attaching the phone holder 501 to said screen, and then fastening a phone 502 to said phone holder body via the second attachment mechanism by holding said phone in proximity to the magnet such that the phone screen is oriented in the same direction as the laptop screen, i.e. outward from the phone holder, after which said phone is securely held in place by magnetic forces. In a second embodiment, said phone may then be oriented by the user by simply moving it to a desired orientation.

The embodiments shown and described above are only exemplary. Even though numerous characteristics and advantages of the present invention have been set forth in the foregoing description together with details thereof, the disclosure is illustrative only and changes may be made within the principles of the invention to the full extent indicated by the broad general meaning of the terms used herein. Various alterations, modifications and substitutions can be made to the circuits and methods of the disclosed invention and the system that implements the present invention without departing in any way from the spirit and scope of the invention.

We claim:

1. A clip-on phone holder comprising:
   a body having a first end and a second end said body defining a length as the distance between said first end and said second end, the body having a forward-facing side and a rearward-facing side and a depth being the distance between said forward-facing and rearward-facing sides, and a height as the distance between an upper side and a lower side;
   a first attachment mechanism at the first end operable to attach said first end to the side of a laptop screen or tablet;
   a second attachment mechanism at the second end operable to attach said second end to the back of a cell phone, said second attachment mechanism comprising a magnet positioned on the forward-facing side of said body second end, facing forward such that a cell phone placed in proximity to said magnet is held in place and oriented such that the front screens of said cell phone and said laptop screen or tablet are facing in substantially the same direction; the
   second attachment mechanism further comprising a spacer being positioned forward of said magnet via struts, such that said spacer is interposed between said magnet and said cell phone.

2. The clip-on phone holder of claim 1 in which said spacer is made of a soft, yielding material.

3. The clip-on phone holder of claim 1 in which said spacer is dimensioned as a annulus having an inner diameter approximately equal to the height of said body.

4. A clip-on phone holder comprising:
   a body dimensioned as a rectangular prism having at a first end a first attachment mechanism operable to attach said first end to the side of a laptop screen or tablet and at a second end a second attachment mechanism operable to attach said second end to the back of a cell phone, said body defining a length as the distance between said first end and said second end, a forward-facing side as being parallel to said laptop screen or tablet orientation, a rearward-facing side as being anti-parallel to said laptop screen or tablet orientation and opposite said forward-facing side, a depth as the distance between said forward- and rearward-facing sides, and a height as the distance between upper and lower sides, the second end of said body being rounded off into a semi-circle, said body being made of a rigid plastic;
   said first attachment mechanism being a clip assembly, said clip assembly comprising a clip member, a pin, and a spring, said clip member comprising a set of supports extending from the upper and lower sides of said clip member in a forward-facing direction and having holes drilled therethrough, said holes being dimensioned to receive said pin;
   said body further comprising corresponding supports extending from said body upper and lower sides in a rearward-facing direction and having holes dimensioned to receive said pin drilled therethrough;
   said clip member support holes, body support holes, and said pin being aligned, said clip member and said body being thus joined at a pivot point by said pin, said clip member being rotatable about the longitudinal axis of said pin; said spring being positioned such that its longitudinal axis is aligned with the longitudinal axis of said pin, the two ends of said spring being extended linearly and positioned so as to press against the rearward-facing side of said body and the forward-facing side of said clip member, respectively, said clip assembly being thereby biased to a closed position, said clip member being made of a rigid plastic;
   said second attachment mechanism comprising a magnet positioned on the forward-facing side of said body second end, facing forward such that a cell phone placed in proximity to said magnet is held in place and oriented such that the screens of said cell phone and said laptop screen or tablet are pointing in substantially the same direction, said magnet being dimensioned as a cylinder having a longitudinal axis length approximately equal to the depth of said body and a diameter approximately equal to the height of said body, said second attachment mechanism further comprising a ball-and-socket joint interposed between said body second end and said magnet, said second attachment mechanism further comprising a spacer being positioned forward of said magnet via struts, such that said spacer is interposed between said magnet and said cell phone, said spacer being dimensioned as a annulus having an inner diameter approximately equal to the height of said body, said spacer being made of a soft, yielding material.

5. The clip-on phone holder of claim 4, in combination with a laptop computer.

6. The clip-on phone holder of claim 4, in combination with a tablet.

* * * * *